Patented Dec. 12, 1922.

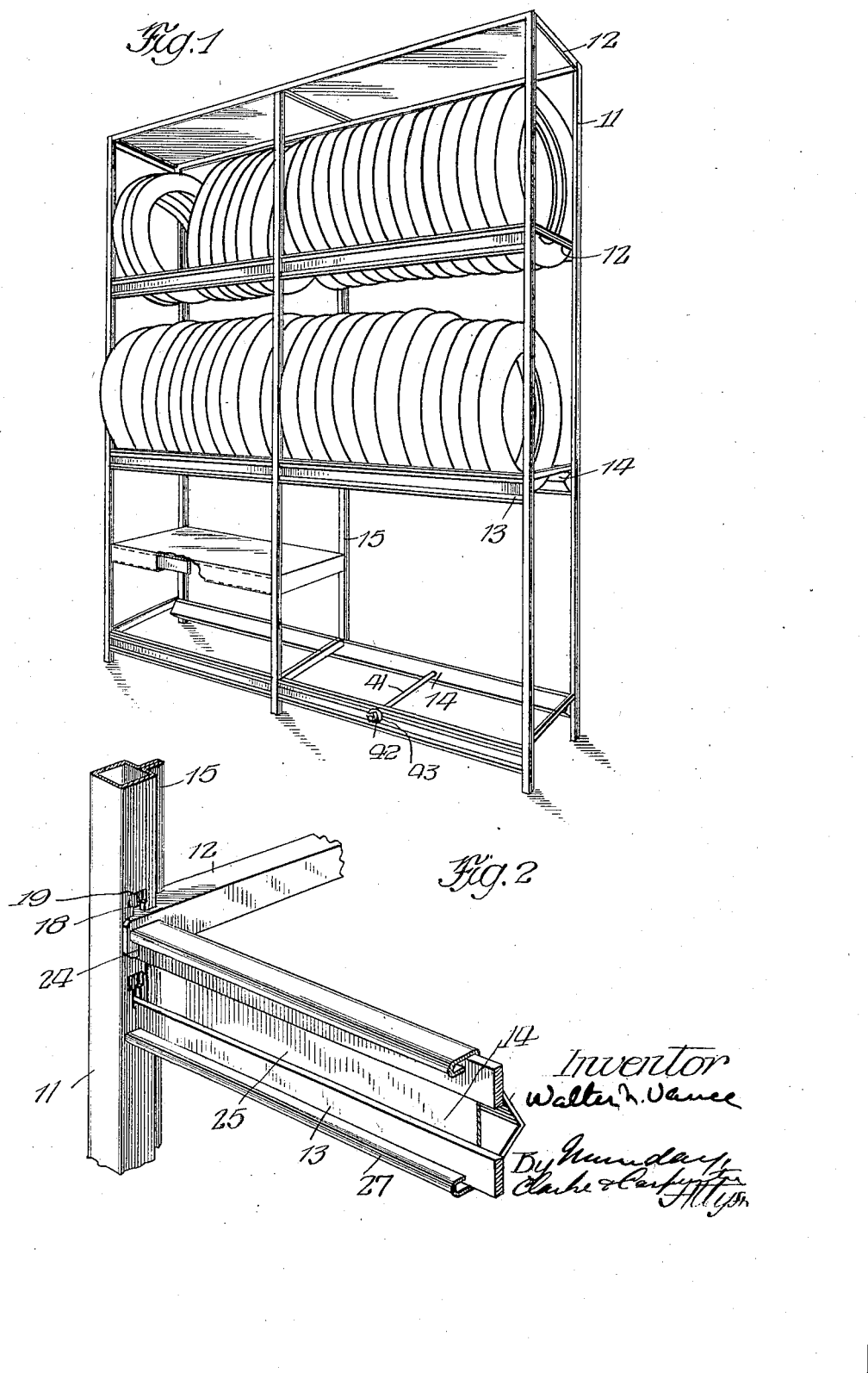

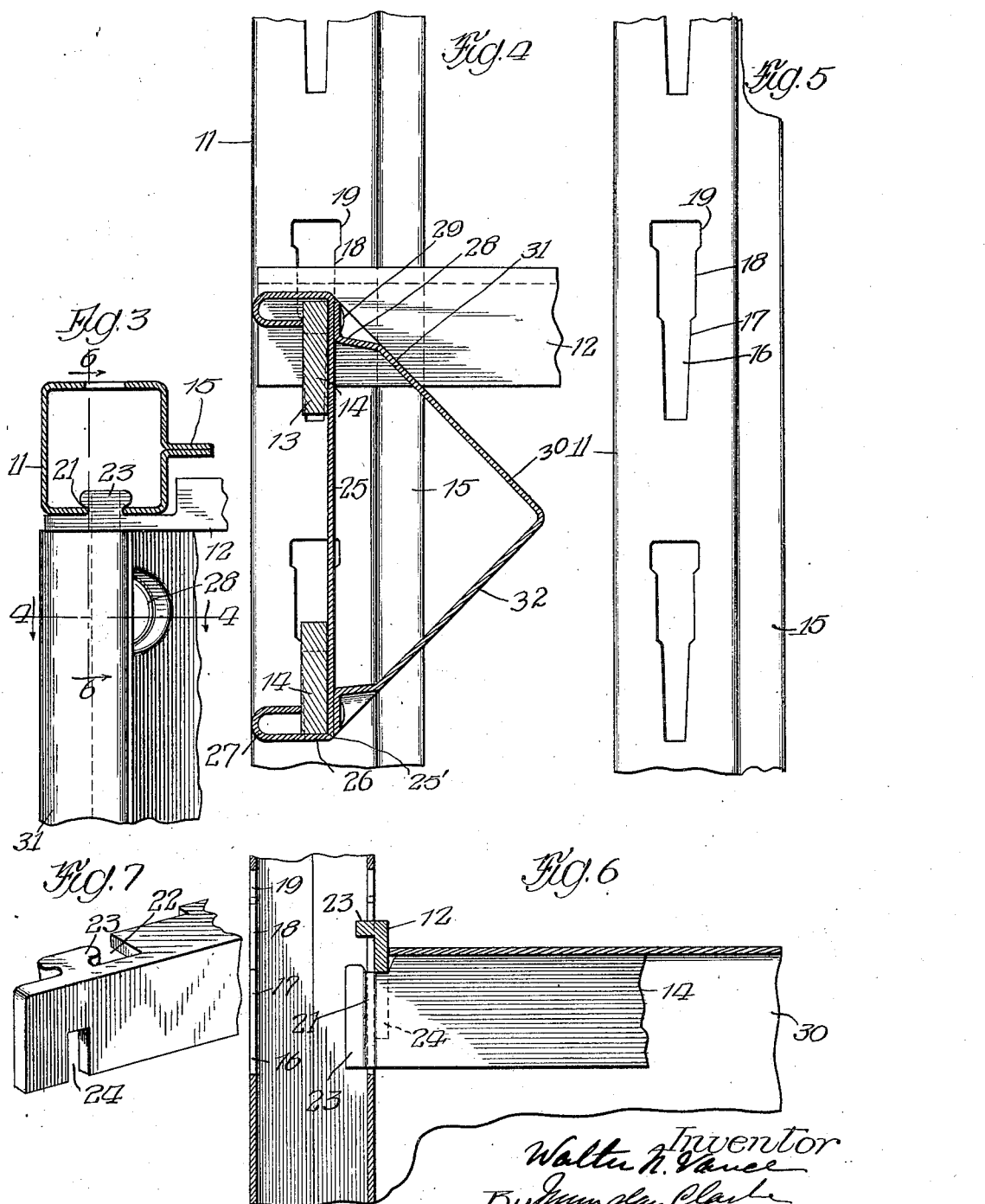

1,438,729

UNITED STATES PATENT OFFICE.

WALTER N. VANCE, OF CHICAGO HEIGHTS, ILLINOIS, ASSIGNOR TO DURAND STEEL LOCKER CO., OF CHICAGO, ILLINOIS, A CORPORATION OF ILLINOIS.

TIRE RACK.

Application filed February 15, 1919. Serial No. 277,225.

*To all whom it may concern:*

Be it known that I, WALTER N. VANCE, a citizen of the United States, residing in Chicago Heights, in the county of Cook and State of Illinois, have invented a new and useful Improvement in Tire Racks, of which the following is a specification.

This invention relates in general to racks, and has more particular reference to the provision of a rack of skeleton construction and adapted for the supporting of articles on edge, particularly of large size, by engagement with their outer circumference, an example of such article being automobile tire shoes.

A principal object of this invention is the provision of a rack of sheet metal for holding automobile tire shoes on edge and without the material of the rack wearing into or marring the tread of such tire shoes.

A still further and highly important object of the invention is the provision of means for converting the rack of Patent No. 1,213,304, issued January 23, 1917, for improvements in metal shelving, invented by me, into a rack for containing automobile tires and shoes.

A still further object of the invention is the provision of a rack of the character described which may constitute a part of such shelving and be sufficiently elastic in its construction to permit any part of it being used for automobile tires by simple proper arrangement of the parts, permitting the rest of the skeleton frame work to be provided with shelves of the character shown in my earlier patent mentioned above. This construction is particularly adapted for garages, dealers in automobile supplies and others, where it is desired to carry a limited number of tires and shoes and other automobile and hardware parts and accessories, all carried in a single set of shelves.

Another object of the invention is the provision of a rack for automobiles tires and wheels which may be quickly and easily assembled and altered in construction, as occasion may require.

A further and highly important object of my invention is the provision of a rack of unusual strength and rigidity, and this without greatly adding to the expense, and adapted for a wide variety of use.

Numerous other objects and advantages of the invention will be apparent as it is better understood from the following description when considered in connection with the accompanying drawing illustrating a preferred embodiment thereof.

Referring to drawing:

Figure 1 is a perspective view of a rack embodying my present invention;

Fig. 2 is an enlarged partial view of an upright and connected parts;

Fig. 3 is a partial section taken horizontally through an upright and just above a tire supporting member;

Fig. 4 is a partial vertical section taken on the line 4—4 of Fig. 3;

Fig. 5 is a partial detailed side elevation of one of the uprights;

Fig. 6 is an enlarged partial section taken substantially on the line 6—6 of Fig. 3; and Fig. 7 is an enlarged perspective view of an end of one of the front to back horizontal supports.

In Figure 1 I have shown a tire rack of two sections and comprising uprights 11, front to back connecting supports 12, cross supports 13 and tire supporting members 14. The uprights are of identical construction and a description of one of them will be sufficient. These uprights each consist of a sheet of metal of suitable length bent to rectangular formation, as may be seen by comparing Figs. 3 and 5. The edges 15 of the sheet extend out from the metal on one side, which in assembled construction is arranged within the rack. That is, these edges extend toward the rear from each front upright and toward the front from each rear upright. Each upright is provided with a plurality of spaced slots 16, each having a lower tapered part 17, an intermediate tapered part 18 and an upper larger part 19, all as in my earlier patent above referred to. The cross supports are engaged or interlocked at their ends 21 in the lower part 17 in appropriate slots, and the front to back supports are of angle iron construction, the horizontal flange of which is cut away at 22 to provide a headed tongue 23 adapted to enter into the enlarged upper end 19 of the slot and move down into interlocking engagement with the part 18 thereof.

The vertical flange of the front to back support is cut away at 24 to fit over the cross supports at the uprights, as may be seen by comparing Figures 4 and 7. This construction locks together the skeleton portion of the frame and the tire supporting members are engaged with and carried by the front and back cross supports, and are so constructed and arranged that they may be positioned or not, as the user may desire, being capable of substitution for shelves of the form mentioned in my patent. Each tire support comprises in the present instance a vertical sheet metal member 25 of length equal substantially to the distance between adjacent uprights at the front or at the back.

The longitudinal edges of the plate or sheet 25 are bent out as indicated at 26 and back at 27 to embrace the opposite edges of two cross supports 14. An angle plate 30 is secured along the inside of the sheet or plate 25 and has its longitudinal edges substantially coincident with edges 25 of the body portion of the plate 25. At intervals the material of the angle plate is pressed inwardly at 28 into metal to metal contact with the inner face of the plate 25, where it is secured by spot-welding at 29, or any other suitable fashion.

This construction provides an inwardly and downwardly inclined tire supporting surface 31, upon which the tread of the wheel or tire may rest, the surface engaging the tread being arranged substantially tangential to its outer circumference—i. e., with the tire resting at the front and back of the rack upon normally presented flat surfaces. The lower part 32 of the angle member acts as a reinforce, preventing bending of the upper portion with the weight of the tires. From certain aspects of the invention the two cross supports at the front and back may be considered to be a single cross support and from certain others as separate members.

The angle member 30 and the channel member 25 constitute a sheet beam triangular in cross sections, the two parts constituting a single unit in effect. The folds 26—27 act also to stiffen and reinforce this beam construction as do also the two cross supports embraced by engaging the member 25. This construction permits of the supporting of a considerable number of heavy tires or wheels or other articles upon a single relatively long space without appreciable deflections. If desired tension rods 41 may be used in addition. These are not believed necessary except where extremely wide spans are required. These rods may be long treaded members extending through suitable apertures in beams and having nuts 42 and a washer 43 on each end.

If it be desired to reduce or increase the capacity of the rack for tires with a corresponding change of the shelf a proper number of cross supports may be removed and tire supporting members positioned or taken away, to replace or be replaced by ordinary shelving.

It is thought that the invention and many of its attendant advantages will be better understood from the foregoing description and it will be apparent that various changes may be made in the form, construction and arrangement of the parts without departing from the spirit and scope of the invention or sacrificing all of its material advantages. The form hereinabove described being merely a preferred embodiment thereof, and of course the invention has valuable application to racks for many articles other than tires.

I claim:

1. A rack for automobile tires and the like comprising slotted front and back uprights, cross supports extending respectively between adjacent front uprights and adjacent back uprights and interlocked in the slots thereof and tire holding members arranged parallel to and interlocked with said supports, said members having inclined upper surfaces.

2. A rack for automobile tires and the like, comprising slotted uprights, front and back cross members interlocked in the slots of said uprights and separate front and back tire holding members engaging said cross supports and providing flat inclined surfaces for engagement by the treads of said tires.

3. A rack for automobile tires and the like, comprising slotted uprights, front and back cross members interlocked in the slots of said uprights, a pair of front cross supports and a pair of back cross supports interlocked in the slots of said uprights and a tire supporting member connected to each of said pairs of cross supports and providing flat surface for engagement by the treads of tires carried thereon, said pair of cross supports and said supporting member forming a unit for supporting appropriate side of the tires.

4. A rack for automobile tires and the like, comprising slotted uprights, front to back cross members interlocked in the slots of said uprights, a pair of front cross supports and a pair of back cross supports interlocked in the slots of said uprights, tire engaging supporting members, one located at the front and the other located at the back and similarly engaging the outer edges of said cross supports and providing flat surfaces for engagement by the treads of the tires supported thereby.

5. A rack for automobile tires and the like, comprising slotted uprights, front to back cross members, front and back cross supports, tire supporting members carried thereby, each of said tire supporting members comprising a flange embracing the top of its cross support and comprising also a downwardly and inwardly inclined supporting part for engagement with the tread of the tire.

6. A rack for automobile tires and the like, comprising slotted uprights, front to back cross members, front and back cross supports, tire supporting members carried thereby, each of said tire supporting members comprising a flange embracing the top of its cross support and comprising also a downwardly and inwardly inclined supporting part and means beneath said supporting part for reinforcing said supporting part.

7. A rack for automobile tires and the like, comprising slotted uprights, cross supports connected thereto and tire supporting members embracing said cross supports at the front and rear, said tire supporting member comprising a channel portion adapted to engage over the edges of the cross support and an angle portion extending inwardly of the rack to provide an inclined reinforced surface for reception of the treads of the tires.

8. A rack for automobile tires and the like, comprising slotted uprights, cross supports connected thereto and tire supporting members embracing said cross supports at the front and rear, said tire supporting member comprising a sheet metal beam of triangular section having a pair of outwardly extending flanges for engagement with an appropriate cross support.

9. A rack for automobile tires and the like, comprising slotted uprights, cross supports at the front and back each engaging in slots in said uprights and adapted for engagement by the edge of a shelf disposed upon both said cross supports and two tire supports, one adapted to be engaged with and supported from the front cross support and the other adapted to be engaged with and supported from the back cross support to provide front and back tire supporting members, said members being of angle formation and presenting inclined surfaces to the treads of the tires.

10. A rack for automobile tires and the like, comprising slotted uprights, cross supports connected thereto and tire supporting sheet metal beams of triangular section carried by said cross supports, said beams being interlocked with and extending parallel to said cross supports.

11. A rack comprising slotted uprights, a plurality of cross members engaging in the slots of each upright and connecting adjacent uprights, and hollow polygonal beams extending between the same uprights connected by said cross members and each engaging a plurality of said cross members.

WALTER N. VANCE.